United States Patent
Schroeder

(10) Patent No.: US 7,246,512 B2
(45) Date of Patent: Jul. 24, 2007

(54) METHOD FOR DETERMINING A ZERO-POINT ERROR IN A VIBRATORY GYROSCOPE

(75) Inventor: Werner Schroeder, Ettenheim (DE)

(73) Assignee: LITEF GmbH, Freiburg im Breisgau (DE)

(*) Notice: Subject to any disclaimer, the term of this patent is extended or adjusted under 35 U.S.C. 154(b) by 0 days.

(21) Appl. No.: 10/553,268

(22) PCT Filed: Mar. 26, 2004

(86) PCT No.: PCT/EP2004/003248

§ 371 (c)(1),
(2), (4) Date: Oct. 12, 2005

(87) PCT Pub. No.: WO2004/090471

PCT Pub. Date: Oct. 21, 2004

(65) Prior Publication Data

US 2006/0201233 A1  Sep. 14, 2006

(30) Foreign Application Priority Data

Apr. 14, 2003 (DE) ................. 103 17 158

(51) Int. Cl.
*G01C 25/00* (2006.01)
*G12B 13/00* (2006.01)

(52) U.S. Cl. .......... 73/1.77; 73/504.02; 73/1.37; 73/1.38; 73/504.16; 33/318

(58) Field of Classification Search .......... 73/1.37, 73/1.38, 504.12, 504.13, 504.14, 504.15, 73/504.16, 1.77, 504.02; 33/318
See application file for complete search history.

(56) References Cited

U.S. PATENT DOCUMENTS

| 4,870,588 | A | * | 9/1989 | Merhav ................. 701/220 |
| 5,377,523 | A | * | 1/1995 | Ohta et al. ............. 73/1.38 |
| 5,847,279 | A | | 12/1998 | Piazza |
| 6,205,838 | B1 | | 3/2001 | Schmid et al. |
| 6,553,833 | B1 | * | 4/2003 | Funk et al. ............ 73/504.14 |
| 6,564,637 | B1 | * | 5/2003 | Schalk et al. ......... 73/504.12 |
| 2003/0074968 | A1 | * | 4/2003 | Fell et al. ............. 73/504.12 |
| 2004/0088127 | A1 | * | 5/2004 | M'Closkey et al. ....... 702/96 |
| 2005/0279155 | A1 | * | 12/2005 | Schroeder ............... 73/1.77 |

FOREIGN PATENT DOCUMENTS

| DE | 4447005 | 7/1996 |
| DE | 19835578 | 2/2000 |
| DE | 19845185 | 4/2000 |
| DE | 10049462 | 4/2002 |
| DE | 10131760 | 1/2003 |
| JP | 60111110 A | * 6/1985 |

* cited by examiner

*Primary Examiner*—Hezron Williams
*Assistant Examiner*—Samir M. Shah
(74) *Attorney, Agent, or Firm*—Elliott N. Kramsky

(57) ABSTRACT

A method for determination of the zero error of a Coriolis gyro. Appropriate disturbance forces are applied to the resonator of the Coriolis gyro such that at least one natural oscillation of the resonator is stimulated that differs from the stimulating and read oscillations. A change in a read signal which represents the read oscillation and results from the stimulation of the at least one natural oscillation is determined as a measure of the zero error.

8 Claims, 2 Drawing Sheets

METHOD FOR DETERMINING A ZERO-POINT ERROR IN A VIBRATORY GYROSCOPE

BACKGROUND

1. Field of the Invention

The present invention relates to Coriolis gyros. More particularly, this invention pertains to a method for determination of a zero error in a Coriolis gyro.

2. Description of the Prior Art

Coriolis gyros (also referred to as "vibration gyros") are in increasing use for navigation. They possess a mass system that is caused to oscillate with the oscillation generally being the superposition of a large number of individual oscillations.

The individual oscillations of the mass system are initially independent of one another and can be referred to abstractly as "resonators". At least two resonators are required for operation of a vibration gyro: one (the first resonator) is artificially stimulated to oscillate, and this is referred to below as the "stimulating oscillation". The other (the second resonator) is stimulated to oscillate only when the vibration gyro is moved/rotated. This is because Coriolis forces occur in this case that couple the first resonator to the second resonator, absorb energy from the stimulating oscillation for the first resonator, and transfer it to the read oscillation of the second resonator. The oscillation of the second resonator is referred to below as the "read oscillation".

In order to determine movements (in particular rotations) of the Coriolis gyro, the read oscillation is tapped off and a corresponding read signal (e.g. the read oscillation tapped-off signal) is investigated to determine whether any changes have occurred in the amplitude of the read oscillation, as they represent a measure of the rotation of the Coriolis gyro. Coriolis gyros may be implemented as both open-loop and closed-loop systems. In a closed-loop system, the amplitude of the read oscillation is continuously reset to a fixed value (preferably zero) by control loops.

An example of a closed-loop version of a Coriolis gyro will be described below in conjunction FIG. 2, a schematic diagram of a Coriolis gyro in accordance with the prior art. The gyro 1 includes a mass system 2 that can be caused to oscillate and is also referred to below as a "resonator". (A distinction exists between this expression and the abstract "resonators" term previously employed for individual oscillations of the "real" resonator. As mentioned, the resonator 2 may be considered as a system composed of two "resonators" (a first resonator 3 and a second resonator 4). Each of the first and the second resonators 3, 4 is coupled to a force sensor (not shown) and to a tapping system (not shown). The noise produced by the force sensor and the tapping systems is indicated schematically by Noise1 (reference symbol 5) and Noise2 (reference symbol 6).

The Coriolis gyro 1 includes four control loops. A first control loop controls the stimulating oscillation (that is to say the frequency of the first resonator 3) at a fixed frequency (resonant frequency). It comprises a first demodulator 7, a first low-pass filter 8, a frequency regulator 9, a VCO (voltage controlled oscillator) 10 and a first modulator 11.

A second control loop controls the stimulating oscillation at constant amplitude. It comprises a second demodulator 12, a second low-pass filter 13 and an amplitude regulator 14.

Third and fourth control loops are employed to reset the forces that stimulate the read oscillation. The third control loop includes a third demodulator 15, a third low-pass filter 16, a quadrature regulator 17 and a third modulator 22 while the fourth control loop comprises a fourth demodulator 19, a fourth low-pass filter 20, a rotation rate regulator 21 and a second modulator 18.

The first resonator 3 is stimulated at resonant frequency $\omega 1$. The resultant stimulating oscillation is tapped off, phase-demodulated by means of the first demodulator 7, and a demodulated signal component is supplied to the first low-pass filter 8 that removes the sum frequencies. (The tapped-off signal is also referred to below as the stimulating oscillation tapped-off signal.) an output signal from the first low-pass filter 8 is applied to a frequency regulator 9 which controls the VCO 10, as a function of the signal supplied to it, such that the in-phase component essentially tends to zero. The VCO 10 passes a signal to the first modulator 11, which controls a force sensor such that a stimulating force is applied to the first resonator 3. When the in-phase component is zero, the first resonator 3 oscillates at its resonant frequency $\omega 1$. (It should be noted that all of the modulators and demodulators are operated on the basis of resonant frequency $\omega 1$.)

The stimulating oscillation tapped-off signal is also applied to the second control loop and demodulated by the second demodulator 12. The output of the second demodulator 12 is passed through the second low-pass filter 13 whose output is, in turn, applied to the amplitude regulator 14. The amplitude regulator 14 controls the first modulator 11 in response to this signal and the output of a nominal amplitude sensor 23 to cause the first resonator 3 to oscillate at a constant amplitude (i.e. the stimulating oscillation has constant amplitude).

As mentioned above, Coriolis forces (indicated by the term $FC \cdot \cos(\omega 1 \cdot t)$ in FIG. 2) occur on movement/rotation of the Coriolis gyro 1. They couple the first resonator 3 to the second resonator 4, and thus cause the second resonator 4 to oscillate. A resultant read oscillation of frequency $\omega 2$ is tapped off and a corresponding read oscillation tapped-off signal (read signal) is supplied to both the third and the fourth control loops. This signal is demodulated in the third control loop by the third demodulator 15, sum frequencies are removed by the third low-pass filter 16, and the low-pass-filtered signal is supplied to the quadrature regulator 17. The output of the quadrature regulator 17 is applied to the third modulator 22 to reset corresponding quadrature components of the read oscillation. Analogously, the read oscillation-tapped-off signal is demodulated in the fourth control loop by the fourth demodulator 19, passed through the fourth low-pass filter 20, and the low-pass-filtered signal then applied to the rotation rate regulator 21 (whose output is proportional to the instantaneous rotation rate, and passed as a rotation rate measurement to a rotation rate output 24) and to the second modulator 18 that resets corresponding rotation rate components of the read oscillation.

A Coriolis gyro 1 as described above may be operated in both double-resonant and non-double-resonant forms. When operated in a double-resonant form, the frequency $\omega 2$ of the read oscillation is approximately equal to that of the stimulating oscillation ($\omega 1$). In the non-double-resonant case, the frequency $\omega 2$ of the read oscillation differs from $\omega 1$. In double resonance, the output signal from the fourth low-pass filter 20 contains corresponding information about the rotation rate. In contrast (non-double-resonant case), the output signal from the third low-pass filter 16 contains the rotation rate information. In order to switch between the double-resonant and non-double-resonant operating modes, a doubling switch 25 selectively connects the outputs of the third and the fourth low-pass filter 16, 20 to the rotation rate regulator 21 and the quadrature regulator 17.

The mass system 2 (resonator) generally has two or more natural resonances (i.e. different natural oscillations of the mass system 2 can be stimulated). One of the natural oscillations is artificially produced stimulating oscillation. Another natural oscillation is represented by the read oscillation, which is stimulated by Coriolis forces upon rotation of the Coriolis gyro 1. As a result of mechanical structure and unavoidable manufacturing tolerances, it is impossible to prevent other natural oscillations, in addition to the stimulating oscillation and the read oscillation, of the mass system 2, in some cases far removed from resonance, from also being stimulated. Such undesirably stimulated natural oscillations change the read oscillation tapped-off signal as they are also (at least partially) read with the read oscillation signal tap. The read oscillation tapped-off signal is thus composed of a part caused by Coriolis forces and a part that originates from the stimulation of undesired resonances. The undesirable part causes a zero error of unknown magnitude. In such case it is not possible to differentiate between the two parts when the read oscillation signal is tapped off.

SUMMARY AND OBJECTS OF THE INVENTION

It is therefore an object of the invention to provide a method for determining the influence of the oscillations of "third" modes and thus, the zero error in the tapped-off read oscillation of a Coriolis gyro.

The present invention addresses the above object by providing, in a first aspect, a method for determination of a zero error of a Coriolis gyro. According to such method, the resonator of the Coriolis gyro has appropriate disturbance forces applied to it such that at least one natural oscillation of the resonator is stimulated. Such natural oscillation differs from the stimulating oscillation and from the read oscillation of the resonator. A change in read signal that represents the read oscillation and results from the stimulation of at least one natural oscillation is determined as a measure of the zero error.

In a second aspect, the invention provides a Coriolis gyro characterized by a device for determination of a zero error. Such device includes a disturbance unit. The unit applies appropriate disturbance forces to the resonator of the Coriolis gyro so that at least one natural oscillation of the resonator is stimulated that differs from the stimulating oscillation and the read oscillation of the resonator.

A disturbance signal detection unit is also provided. Such unit determines a disturbance component as a measure of the zero error. The disturbance component is contained in a read signal that represents the read oscillation produced by the stimulation of at least one natural oscillation.

The foregoing and other features of the invention will become further apparent from the detailed description that follows. Such description is accompanied by a set of drawing figures in which numerals, corresponding to those of the written description, point to the features of the invention. Like numerals refer to like features throughout both the written description and the drawing figures.

DETAILED DESCRIPTION OF THE PREFERRED EMBODIMENT

Figure 1:
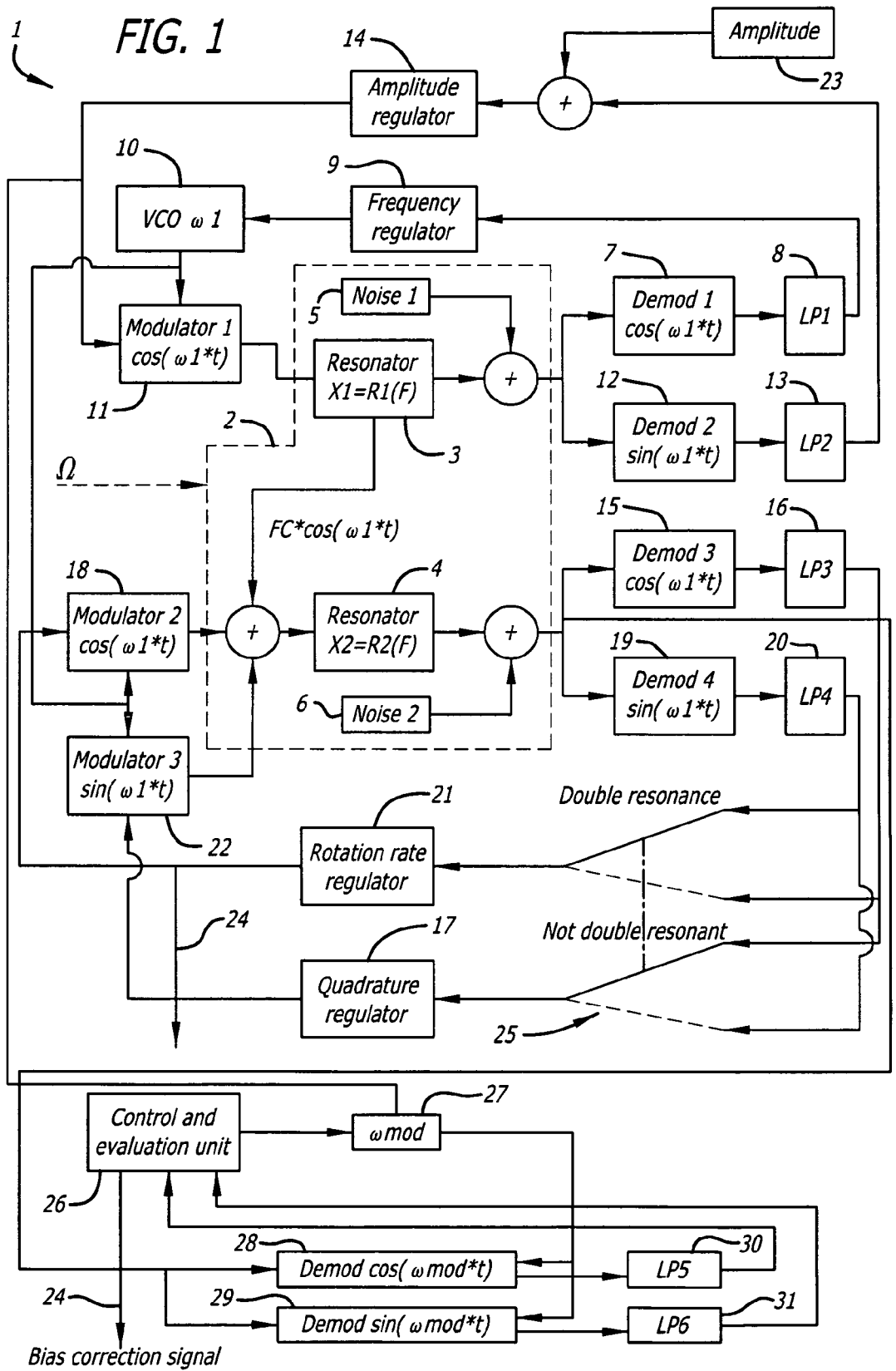
FIG. 1 is a schematic diagram of a Coriolis gyro in accordance with the present invention.
Figure 2:
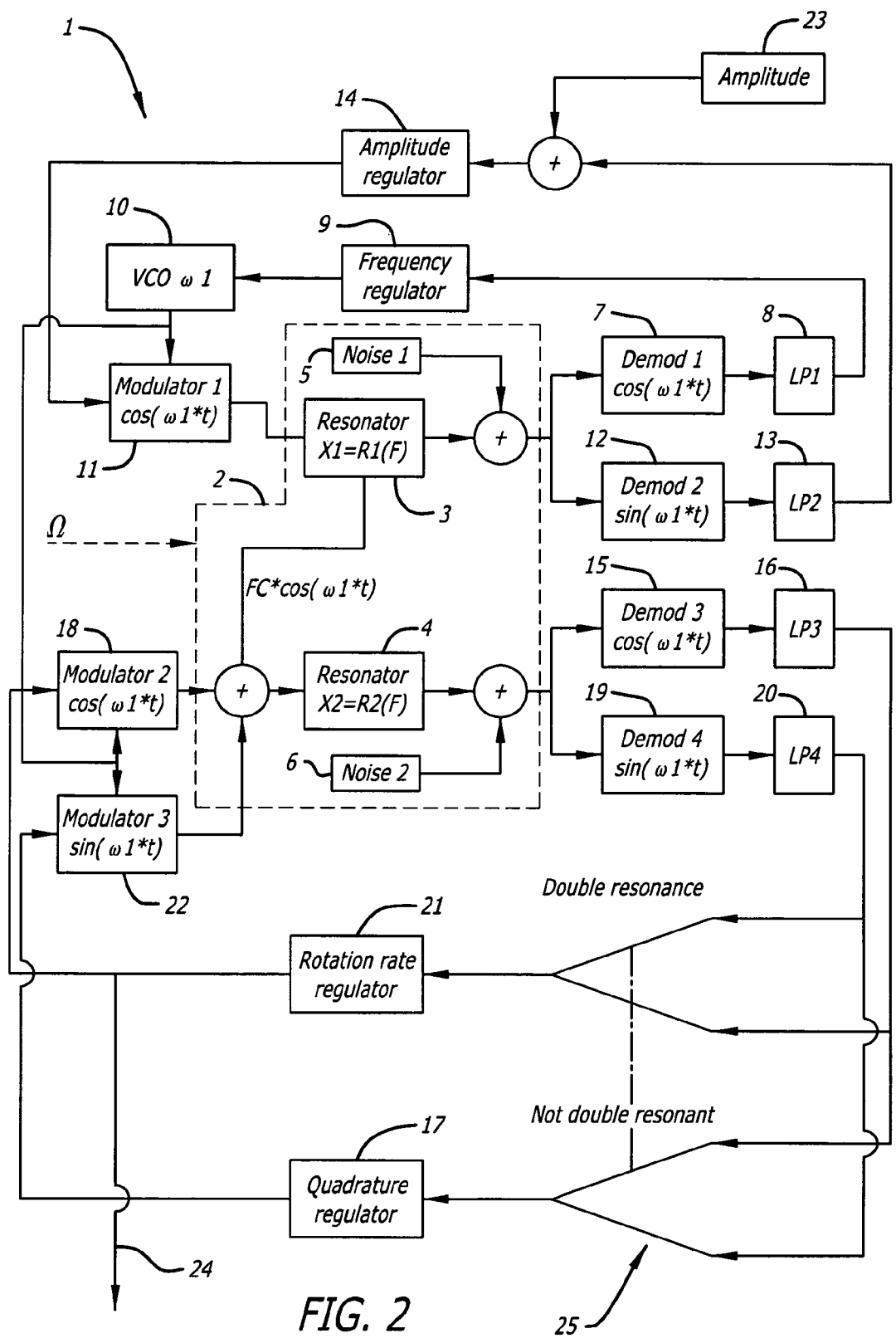
FIG. 2 is a schematic diagram of a Coriolis gyro in accordance with the prior art.

FIG. 1 is a schematic diagram of a Coriolis gyro in accordance with the present invention. In it, parts and devices which correspond to those of the prior art device of FIG. 2 are indicated by identical reference symbols and not discussed below. The method of the invention will be explained below with reference to FIG. 1.

A reset Coriolis gyro includes a control and evaluation unit 26, a modulator 27 (disturbance unit) having a variable frequency $\omega$mod and, preferably an adjustable amplitude, demodulators 28, 29 that operate in quadrature at the frequency $\omega$mod, and fifth and sixth low-pass filters 30 and 31. The disturbance unit 27 produces an alternating signal at the frequency $\omega$mod. This is added to the force input of the stimulating oscillation (first resonator 3). The signal is also supplied as a reference signal to the demodulators 28, 29. An alternating force, corresponding to the alternating signal, is thus additionally applied to the resonator 2. Such alternating force stimulates a further natural oscillation (also referred to as a "third" natural mode) of the resonator 2 (in addition to the stimulation oscillation). The effects of the further natural oscillation can be observed in the form of a disturbance component in the read oscillation tapped-off signal.

The read oscillation tapped-off signal is subjected to a demodulation process in phase and quadrature with respect to the stimulation produced by the modulator 27. Such demodulation process is performed by the demodulators 28, 29 at the frequency $\omega$mod (disturbance frequency). The signal thus obtained is low-pass filtered (by the fifth and the sixth low-pass filters 30, 31), and supplied to the control and evaluation unit 26.

The control and evaluation unit 26 controls the frequency $\omega$mod and, if appropriate, the stimulation amplitude of the alternating signal produced by the modulator 27, in such a way that the frequencies and strengths of the "significant" third natural modes, as well as their Q factors, are continuously determined. Such factors are utilized by the control and evaluation unit 26 to calculate respective instantaneous bias error. Such calculated errors are supplied to correct gyro bias.

The idea on which the invention is based is to artificially stimulate undesired natural oscillations of the resonator (that is to say natural oscillations which are neither the stimulating oscillation nor the read oscillation) and to observe their effects on the read oscillation tapped off signal. The undesired natural oscillations are, in such case, stimulated by application of appropriate disturbance forces to the resonator. The "penetration strength" of such disturbances to the read oscillation tapped-off signal represents a measure of the zero error (bias) of the Coriolis gyro. Thus, if the strength of a disturbance component contained in the read oscillation tapped-off signal is determined and is compared with the strength of the disturbance forces producing this disturbance component, it is then possible to derive the zero error.

The artificial stimulation of the natural oscillations and the determination of the "penetration" of the natural oscillations to the read oscillation tapped-off signal preferably takes place during operation of the Coriolis gyro. However, the zero error can also be established without the existence of any stimulating oscillation.

Both the strength of the disturbance component in the read signal and the resonance Q factor of the corresponding natural oscillation must be determined in order to determine the zero error. These values are then calculated to obtain the zero error. To determine the resonance Q factor, the frequency of the disturbance unit must be detuned over the resonance while, at the same time, carrying out a measurement by means of the disturbance signal detector unit. This is preferably achieved by means of software, whose function is as follows:

- searching for the "significant" third (disturbing) natural resonances
- moving away from the associated resonance curve
- calculating the Q factor and the strength of the stimulation, and the "visibility" of this third oscillation in the read channel; and
- calculating the contribution of this third oscillation to the bias on the basis of the Q factor, strength and "visibility".

The bias can be compensated by calculation (e.g. by means of software).

While this invention has been described with reference to its presently-preferred embodiment, it is not limited thereto. Rather, the invention is limited only insofar as it is defined by the following set of patent claims and includes within its cope all equivalents thereof.

What is claimed is:

1. A method for determination of a zero error in a Coriolis gyro in which:
   - the resonator of the Coriolis gyro has appropriate disturbance forces applied to it such that at least one natural oscillation of the resonator is stimulated, which differs from the stimulating oscillation and from the read oscillation of the resonator,
   - a change in a read signal which represents the read oscillation and results from the stimulation of at least one natural oscillation is determined as a measure of the zero error, and
   - the disturbance forces are alternating forces at appropriate disturbance frequencies, with the disturbance frequencies being natural oscillation frequencies of the resonator.

2. The method as claimed in claim 1, characterized in that the change in the read signal is recorded by subjecting the read signal to a demodulation process based on the disturbance frequencies.

3. The method as claimed in claim 1, characterized in that the zero error contribution which is produced by one of the at least one natural oscillations is determined by determination of the strength of the corresponding change in the read signal, determination of the corresponding resonance Q-factor of the natural oscillation and by calculation of the determined strength and resonance Q-factor.

4. The method as claimed in claim 3, characterized in that the resonance Q-factor of a natural oscillation is determined by detuning the corresponding disturbance frequency while at the same time measuring the change produced by this in the read signal.

5. The method as claimed in claim 1, characterized in that two or more successive natural oscillations of the resonator are stimulated, corresponding changes in the read signal are recorded, and corresponding zero error contributions are determined, with the zero error of the Coriolis gyro being determined by addition of the zero error contributions.

6. A Conchs gyro characterized by a device for determination of the zero error of the Coriolis gyro having:
   - a disturbance unit which applies appropriate disturbance forces to a resonator of the Coriohis gyro such that at least one natural oscillation of the resonator is stimulated, which differs from the stimulating oscillation and the read oscillation of the resonator,
   - a disturbance signal detection unit, which determines a disturbance component, which is contained in a read signal that represents the read oscillation and has been produced by the stimulation of the at least one natural oscillation, as a measure of the zero error, and
   - the disturbance forces are alternating forces at appropriate disturbance frequencies, with the disturbance frequencies being natural oscillation frequencies of the resonator.

7. The Coriolis gyro as claimed in claim 6, characterized in that the disturbance signal detection unit comprises two demodulators, which operate in quadrature with respect to one another, two lowpass filters and a control and evaluation unit, with the demodulators being supplied with the read oscillation tapped-off signal, with the output signals from the two demodulators, being filtered, in each case, by one of the low-pass filters, and with the output signals from the low-pass filters being supplied to the control and evaluation unit, which determines the zero error on this basis.

8. The Coriolis gyro as claimed in claim 7, characterized in that the control and evaluation unit acts on the disturbance unit on the basis of the signals supplied to it, by which means the frequencies of the disturbance forces can be controlled by the control and evaluation unit.

* * * * *